United States Patent
Mathews et al.

(10) Patent No.: US 11,942,748 B2
(45) Date of Patent: Mar. 26, 2024

(54) METHOD FOR ESTABLISHING A CONNECTION BETWEEN AN ELECTRICAL CONNECTING ELEMENT FOR A MOTOR VEHICLE ON-BOARD NETWORK AND A CABLE OF THE MOTOR VEHICLE ON-BOARD NETWORK

(71) Applicant: Auto-Kabel Management GmbH, Hausen i.W. (DE)

(72) Inventors: Rene Mathews, Neuss (DE); Kai Moldenhauer, Erkelenz (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 783 days.

(21) Appl. No.: 16/979,676

(22) PCT Filed: Dec. 14, 2018

(86) PCT No.: PCT/EP2018/085021
§ 371 (c)(1),
(2) Date: Sep. 10, 2020

(87) PCT Pub. No.: WO2019/179650
PCT Pub. Date: Sep. 26, 2019

(65) Prior Publication Data
US 2021/0044071 A1 Feb. 11, 2021

(30) Foreign Application Priority Data
Mar. 21, 2018 (DE) .................. 10 2018 002 297.9
May 17, 2018 (DE) .................. 10 2018 111 853.8

(51) Int. Cl.
*H01R 43/28* (2006.01)
*B23K 20/10* (2006.01)
(Continued)

(52) U.S. Cl.
CPC .......... *H01R 43/28* (2013.01); *B23K 20/106* (2013.01); *B23K 20/2275* (2013.01);
(Continued)

(58) Field of Classification Search
CPC ........ H01R 43/28; H01R 11/26; H01R 4/029; H01R 43/0214; H01R 43/02; H01R 4/62; H01R 4/02
(Continued)

(56) References Cited

U.S. PATENT DOCUMENTS 1,147,450 A * 7/1915 Shaw ..................... H01R 4/185
 29/863
2,323,758 A * 7/1943 Temple, Jr. ............. H01R 4/08
 72/414
(Continued)

FOREIGN PATENT DOCUMENTS

CN 102473865 A 5/2012
CN 103299493 A 9/2013
(Continued)

OTHER PUBLICATIONS

China National Intellectual Property Administration, Office Action, Application No. 201880091528.0, dated Apr. 30, 2021, with English translation, 24 pages.
(Continued)

*Primary Examiner* — Alexander Gilman
(74) *Attorney, Agent, or Firm* — Sunstein LLP (57) ABSTRACT

Method for establishing a connection between an electrical connecting element for a motor vehicle on-board network and a cable of the motor vehicle on-board network in which the cable (2) is provided with a metallic stranded conductor (4), firstly the metallic stranded conductor is mechanically compacted in such a way that a flat area is formed, whereby during the compacting, a material bond is formed between
(Continued)

strands of the stranded conductor (4), and subsequently, the connecting element is connected to the flat region in a material bond.

20 Claims, 6 Drawing Sheets (51) Int. Cl.
| | |
|---|---|
| *B23K 20/227* | (2006.01) |
| *B23K 20/233* | (2006.01) |
| *H01R 11/26* | (2006.01) |
| *H01R 11/28* | (2006.01) |
| *B23K 101/00* | (2006.01) |
| *B23K 101/32* | (2006.01) |
| *B23K 101/38* | (2006.01) |
| *B23K 103/04* | (2006.01) |
| *B23K 103/10* | (2006.01) |
| *B23K 103/12* | (2006.01) |
| *B23K 103/20* | (2006.01) |
| *H01R 4/02* | (2006.01) |
| *H01R 43/02* | (2006.01) |

(52) U.S. Cl.
CPC ...... *B23K 20/2333* (2013.01); *B23K 20/2336* (2013.01); *H01R 11/26* (2013.01); *H01R 11/281* (2013.01); *B23K 2101/006* (2018.08); *B23K 2101/32* (2018.08); *B23K 2101/38* (2018.08); *B23K 2103/05* (2018.08); *B23K 2103/10* (2018.08); *B23K 2103/12* (2018.08); *B23K 2103/20* (2018.08); *H01R 4/029* (2013.01); *H01R 43/0207* (2013.01); *H01R 43/0214* (2013.01)

(58) Field of Classification Search
USPC .......................................................... 439/874
See application file for complete search history.

(56) References Cited

U.S. PATENT DOCUMENTS

| | | | | |
|---|---|---|---|---|
| 3,956,823 | A * | 5/1976 | Kuo .................... | H01R 4/20 |
| | | | | 174/94 R |
| 4,775,337 | A * | 10/1988 | Van Wagener ........ | H01R 11/12 |
| | | | | 439/883 |
| 5,960,540 | A * | 10/1999 | Pentz .................... | H01R 43/16 |
| | | | | 29/33 M |
| 7,467,968 | B1* | 12/2008 | Sink ..................... | H01R 11/11 |
| | | | | 439/883 |
| 8,288,653 | B2* | 10/2012 | Stroh .................... | H01R 4/187 |
| | | | | 174/88 R |
| 9,005,797 | B2* | 4/2015 | Schroeter ........... | H01M 10/0525 |
| | | | | 429/153 |
| 9,419,490 | B2* | 8/2016 | Kajita ................. | H02K 15/0062 |
| 9,447,462 | B2* | 9/2016 | Ecker .................. | C12Q 1/6851 |
| 10,500,679 | B2* | 12/2019 | Wang ................... | B23K 11/30 |
| 10,559,896 | B2* | 2/2020 | Sato ..................... | H01R 43/048 |
| 10,727,615 | B2* | 7/2020 | Gregor ................. | B23K 20/10 |
| 11,069,991 | B2* | 7/2021 | Wang ................. | H01R 43/0207 |
| 11,205,860 | B2* | 12/2021 | Scharkowski ......... | H01R 4/625 |
| 11,355,871 | B2* | 6/2022 | Wang .................. | B23K 20/004 |
| 11,437,741 | B2* | 9/2022 | Nakai .................. | H01R 11/26 |
| 11,489,271 | B2* | 11/2022 | Scharkowski ......... | H01R 4/023 |
| 2008/0032569 | A1* | 2/2008 | Steiner ................. | B23K 20/10 |
| | | | | 228/110.1 |
| 2012/0000069 | A1* | 1/2012 | Hagi ...................... | H01R 43/28 |
| | | | | 29/864 |
| 2012/0177977 | A1* | 7/2012 | Schroeter ............ | H01M 50/258 |
| | | | | 429/153 |
| 2013/0181038 | A1* | 7/2013 | Elliot .................... | B32B 18/00 |
| | | | | 228/221 |
| 2013/0293045 | A1* | 11/2013 | Kajita .................... | B23K 20/10 |
| | | | | 310/71 |
| 2014/0182127 | A1* | 7/2014 | Kovacs ............. | H01R 13/65912 |
| | | | | 219/121.64 |
| 2016/0006146 | A1* | 1/2016 | Schreck ................ | H01R 11/28 |
| | | | | 439/668 |
| 2016/0116355 | A1* | 4/2016 | Stroh .................... | G01L 5/0076 |
| | | | | 702/43 |
| 2016/0199932 | A1* | 7/2016 | Kern ..................... | H01R 4/187 |
| | | | | 439/874 |
| 2016/0250984 | A1* | 9/2016 | Gottschlich ........ | H01R 43/0207 |
| | | | | 307/10.1 |
| 2016/0336662 | A1* | 11/2016 | Ooba ................. | H01R 43/0207 |
| 2017/0318660 | A1* | 11/2017 | Roan ..................... | H05K 1/115 |
| 2019/0217428 | A1* | 7/2019 | Packebusch ....... | B23K 37/0435 |
| 2019/0319375 | A1* | 10/2019 | Scharkowski ..... | H01R 43/0207 |

FOREIGN PATENT DOCUMENTS

| | | |
|---|---|---|
| CN | 105723564 A | 6/2016 |
| DE | 10 2006 050 708 A1 | 5/2008 |
| DE | 10 2012 206 145 A1 | 10/2013 |
| DE | 10 2013 004 708 A1 | 9/2014 |
| DE | 10 2013 017 660 A1 | 4/2015 |
| EP | 2 022 144 B1 | 9/2012 |
| EP | 2 981 389 B1 | 4/2017 |
| EP | 2 996 834 B1 | 10/2018 |
| JP | S63-198275 A | 8/1988 |
| JP | S63198275 A | 8/1988 |
| WO | 2006/010551 A2 | 2/2006 |

OTHER PUBLICATIONS

International Searching Authority/EP, International Search Report and Written Opinion of the International Searching Authority, Application No. PCT/EP2018/085021, dated Apr. 5, 2019, with English translation of the International Search Report, 17 pages.
German Patent Office, Office Action, Application No. 10 2018 111 853.8, dated Dec. 20, 2018, 6 pages.

* cited by examiner

METHOD FOR ESTABLISHING A CONNECTION BETWEEN AN ELECTRICAL CONNECTING ELEMENT FOR A MOTOR VEHICLE ON-BOARD NETWORK AND A CABLE OF THE MOTOR VEHICLE ON-BOARD NETWORK

CROSS-REFERENCE TO RELATED APPLICATIONS

This application is the national phase entry of international patent application no. PCT/EP2018/085021 filed Dec. 14, 2018 and claims the benefit of German patent applications No. 10 2018 002 297.9, filed Mar. 21, 2018 and No. 10 2018 111 853.8, filed May 17, 2018, the disclosures of which are incorporated herein by reference in their entirety.

TECHNICAL FIELD

The subject matter relates to a method of establishing a connection between an electrical connecting element for a motor vehicle on-board network and a cable of the motor vehicle on-board network. The subject-matter also relates to a cable and the use of such a cable.

BACKGROUND ART

In a motor vehicle on-board network it is necessary to realise electrical outlets to consumers from a main energy line which is directly connected to the positive pole of the battery. Due to the large number of electrical consumers to be connected in an on-board network, a wide branching of the on-board network line is necessary. Some consumers require high power from the battery and must therefore be connected to the distribution network via cables with large cross-sections. Groups of consumers often have to be protected by a common fuse, on the other hand it is also necessary to provide a number of individually fused wiring harnesses originating from the main power line.

The tapping of electrical energy from the main power line is not easily possible. On the one hand, such a tap is associated with a contact resistance and thus ohmic losses and on the other hand, there is an increased risk of corrosion at the taps.

Instead of round cables, the automotive industry is increasingly using shaped aluminium flat cables. This is especially true for battery cables, especially the B+ cable, on which high currents are flowing. It is also possible to realize large cable cross sections in case of small installation spaces, i.e. narrow and inaccessible areas, and also to increase the current carrying capacity of the battery cables.

However, round conductors are still used for contacting electrical consumers. This is mainly due to the fact that the electrical consumers must be contacted mostly via flexible cables. When installing the connecting cables between rigid battery cables and electrical consumers, it is often necessary to thread the cables into tight installation spaces, which is easier with round conductors than with rigid flat conductors. For the realization of e.g., transfer points with screw-on studs, which are also the subject matter of the invention, additional partial elements are currently still necessary on which the screw-on studs can be welded in order to be able to finally connect a contact element (e.g. a cable lug).

Furthermore, when using aluminium cables, the electrical tap is always exposed to the danger that the contact resistance becomes high due to oxidation of the aluminium conductor and the electrical power loss at this contact resistance leads to undesired heating of the cable. Based on these problems, the subject matter was based on the object to provide a method through which the tapping of a stranded cable can be realized very easily.

SUMMARY OF THE INVENTION

Especially in motor vehicle on-board networks, preferably in those in which the battery is located in the rear of the vehicle and the drive engine, in particular the starter of the combustion engine, but also possibly an electric motor for the drive, is located in the engine compartment, the main battery harness runs from the rear to the front of the vehicle. This can be achieved by underfloor installation of the battery line or by laying the battery line inside the vehicle. Along this battery harness, a number of electrical outlets can be realized in a particularly simple way with the help of the connection console according to the subject matter.

Especially if the battery harness is formed by an aluminium conductor, especially a stranded aluminium conductor, it is problematic to arrange connection consoles at such conductors. With the help of the solution according to the subject matter, it is possible to establish a connection between a connecting element and the cable in an uninsulated area, especially in a central area of the cable remote from the ends of the conductor, but also at at least one uninsulated end of a cable.

According to the subject matter, the cable is first provided with a metallic stranded conductor. Here, the cable may or may not be provided with an insulation. In the first case, the insulation can first be removed. The uninsulated area of the cable, i.e. the bare strands of the stranded conductor which forms the core of the cable, can be brought to a compaction device.

Then, the metallic stranded conductor is first mechanically compacted. During this process, the strands of the stranded conductor are pressed together. In doing so, a connection between cavities between the strands is prevented if possible. During compaction, the strands are joined together with a material bond. A material bond is preferably created on the outer lateral surfaces of the strands. The compaction creates a flat area. The flat area can also be regarded as a connection area. In the area of the flat area the strands are connected to each other by means of material connection. A compact area is formed in which the rigidity of the stranded cable is considerably increased compared to the non-compacted stranded cable.

After compaction is completed, the flat area can be used as a connection area for connecting a connecting element. A connecting element can be another cable, e.g. a flat conductor or a round conductor, each made of solid material or as a stranded conductor, a connecting bolt, a tap, a contact eye or sleeve or the like. The connecting element can be connected to the flat area with a material bond.

It is also proposed to compact a multi-wire aluminium or copper stranded cable (e.g. round cable, braid) e.g. by welding, e.g. ultrasonic welding, and then to weld a connecting element (e.g. a threaded bolt) onto the resulting surface (e.g. by friction welding). Optionally, a connecting element can be welded onto both surfaces (from above and from below). The previously necessary terminal can thus be omitted and one process step can be saved. Furthermore, the required installation space is reduced, weight is saved and consequently production costs are lowered.

Aluminium, for example, can be used as the base material of the connecting element connecting element. In order that a nut can be screwed on with sufficient torque, a harder material (e.g. stainless steel or a copper alloy) can be used for the connecting element connecting element. However, the use of aluminium as the base material has the advantage that the resistance against corrosion of the component and thus of the interface between the strands and the connecting element connecting element and ultimately of the entire system is significantly increased. The resistance against corrosion can be further increased by an additional coating of the connecting element (e.g. with nickel).

It is also proposed that the flat area is compacted with a degree of compaction of between 70% and 100%, especially with a degree of compaction of between 85% and 95%. Such a high degree of compaction leads to the desired rigidity of the flat area, so that a connecting element can be welded on there. The material in the flat area does not flow under the load of the welding tool to such an extent that welding is impossible. Furthermore, in this compacted state, the strands form an almost even contact surface.

It is also proposed that the flat area is compacted by welding the strands of the stranded conductor, in particular that the flat area is compacted by means of ultrasonic welding or by means of resistance welding. By welding the strands to each other it is ensured that they do not move relative to each other and absorb welding energy during the subsequent connection to the connecting element. During resistance welding and the associated compaction, the surfaces that lie against the tools become smooth.

It is also proposed that the surface used for welding of the welding tool used during compaction is profiled in relief. This creates areas in the flat area that are more highly compacted and areas that are less highly compacted. The profile ensures that at least in the more highly compacted areas the strands are welded together sufficiently well.

It is also proposed that a relief-shaped profile impressed into the flat area during welding runs at an angle to the longitudinal axis of the strands of the stranded conductor. The angled profile, especially essentially perpendicular to the longitudinal axis of the strands or the cable, ensures that the flat area is sufficiently compacted over its entire width. It is also ensured that external strands are included in the compaction step and do not protrude as loose strands from the flat area and are not connected to the flat area. A fibrillation of the flat area is thus avoided.

It is also proposed that the profile is strip-shaped or grid-shaped. Both forms offer the advantage of connecting all strands to the flat area.

It is also proposed that the profile is applied on the flat area by an anvil and/or a sonotrode of the welding tool. In this way a profiling of the flat area is already achieved in the compacting step.

It is also proposed that the profile be applied on both sides of the flat area. This achieves a particularly good compaction in those areas where the profile extends into the flat area. In addition, the strands on both sides of the flat area are compacted equally.

It is also proposed that the profile is introduced by complementary contours on the surfaces used for welding of the welding tool used for compaction and/or the profile is introduced by congruent contours on the surfaces used for welding of the welding tool used for compaction. It can be sensible to make the areas extending into the flat area lying against each other so that a particularly high degree of compaction is achieved. On the other hand, with complementary profiling, uniform compaction can be achieved throughout the entire flat area.

It is also proposed that an end-to-end recess is formed in the flat area and the connecting element is placed in the recess. A ring-shaped, sleeve-shaped and/or rivet-like connecting element can be arranged in the recess. The recess can be formed e.g. by punching out holes of corresponding size in the flat area. In particular, the connecting element connecting element is ring-shaped.

It is also proposed that the connecting element be connected in a material bond to the strands on both sides of the flat area. A particularly good connection between the flat area and the connecting element can be achieved by connecting both sides of the recess.

A further subject matter is a cable with a metallic stranded conductor manufactured according to a process described here.

It is proposed that the cable has an insulation of the stranded conductor, that the flat area is located in a stripped area located between two insulation sections of the insulation and that the connecting element is connected to the conductor in the flat area in a material bond. Then a tap can be realized in a central area of the cable. It goes without saying that the insulation can also be removed at an end face and the flat area is located in the end area of the stranded conductor.

It is also proposed that in the insulation sections the insulation completely encloses the stranded conductor.

It is also proposed that the stranded conductor is a round conductor and/or that the stranded conductor is made of aluminium or an alloy thereof or of copper or an alloy thereof.

It is also proposed that the connecting element is formed of aluminium or alloys thereof and/or that the connecting element is formed of copper or alloys thereof, steel or stainless steel and/or that the connecting element is tin-plated and/or under-nickel-plated. Preferably, the transition between the stranded conductor and the connecting element is of the same material.

It is also proposed that the connecting element is ring-shaped sleeve-shaped and is connected to the flat area on both sides of the flat area by collars pointing radially outwards. The collar can be connected in a material bond to the flat area on the surface facing the flat area.

It is also proposed that the connecting element and the stranded conductor be encased, preferably overmoulded, with an insulation, especially up to and beyond the insulation of the stranded conductor.

The flat area is preferably located between the ends of the cable and is preferably arranged in a central area of the cable. In particular, the flat area is located away from the distal ends of the cable. Due to the arranging the connecting element on the conductor in a material bond, a high current flow with low electrical losses is possible.

In particular, the conductor of the electrical cable is insulated and in the flat area the conductor is free of insulation. Thus the flat area is between two insulated areas of the conductor. If several stripped areas are provided, one or more connecting elements can be provided along the course of the cable, through which electrical taps can be made. Especially if the cable is a main battery line, a variety of electrical taps can be made possible on the battery line without negatively affecting the conductance of the battery line as such by otherwise necessary interruptions. The taps do not lead to an increased electrical power loss along the cable, as the cable is not interrupted by the taps.

Due to the material bond with the connecting element, the cable remains undamaged and its conductance is essentially unaffected. This makes it possible to run a one- or two- or multi-piece cable from the battery to the engine compartment, in particular to the starter or to the electric motor in the engine compartment, which is not or only marginally influenced by taps in its electrical conductivity of a section each. The insulation of the cable is such that it completely encloses the conductor in the insulation sections. The insulation is preferably made of a non-conductor, in particular a plastic, such as PVC or silicone.

Preferably, the cable is flexurally rigid and thus not plastically deformable, especially due to its own weight. It is also proposed that the conductor is made of aluminium or an alloy thereof. E-aluminium in particular, for example Aluminium 99.5, can be used for the conductor.

Depending on the use of the material of the conductor, the connecting element is preferably formed from an electrically similar, in particular the same metallic material. If the conductor is made of copper or an alloy thereof, for example, the connecting element can also be made of copper. The use of an electrically similar or identical metal for the connecting element and the conductor ensures a pure connection between connecting element and conductor. Contact corrosion is thus prevented or reduced to a minimum.

A particularly good connection between the connecting element and the conductor is possible if it is produced by ultrasonic welding. Ultrasonic welding breaks up any possibly existing aluminium oxide layer on the conductor and the resulting weld joint is largely free of aluminium oxide. This reduces the contact resistance in the area of the weld node compared to conventional welding methods.

According to an embodiment, it is proposed that the connecting element is connected to the flat area by means of friction welding, especially rotational friction welding or friction spot welding, but also by means of electric welding. Friction welding of the connecting element to the conductor can also be used to break up any aluminium oxide layer on the strands of the conductor and keep the contact resistance between the flat part and the connecting bolt low.

BRIEF DESCRIPTION OF THE DRAWINGS

In the following, the subject matter is explained in more detail by means of a drawing showing design examples. In the drawing show:

FIG. 3b a view of a connecting bolt according to a further embodiment;
FIG. 3c a view of a connecting bolt according to a further embodiment.

DETAILED DESCRIPTION OF SPECIFIC EMBODIMENTS

Figure 1A:
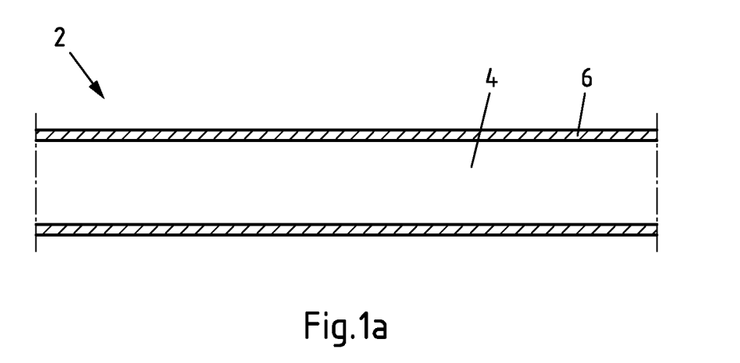
FIG. 1a a cross-section of a cable.

FIG. 1a shows an electric cable 2 with a metallic stranded conductor 4 and insulation 6.

The metallic conductor 4 is preferably a stranded conductor and is particularly resistant to bending. The conductor 4 is preferably a round conductor. The material of the strands of conductor 4 is preferably aluminium, in particular aluminium 99.5. The bending stiffness of cable 2 results when cable 2 cannot be plastically deformed due to its own weight. A force greater than the weight force is required to cause plastic deformation of cable 2.

The insulation 6 is preferably made of PVC or silicone.

Figure 1B:
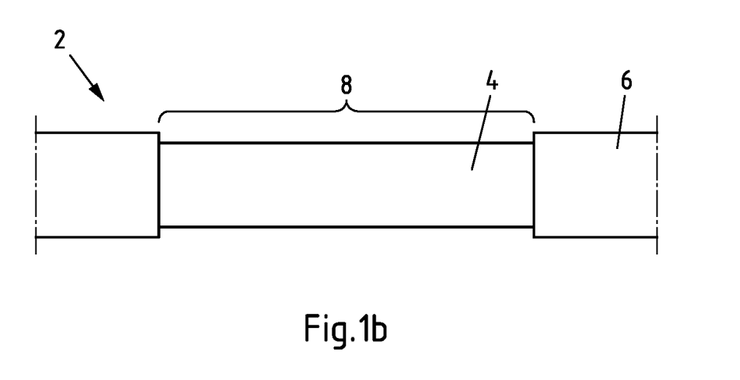
FIG. 1b a view of a stripped cable.

As shown in FIG. 1b, cable 2 may be stripped in a central area, i.e. away from its respective distal ends, so that a stripped area 8 is formed. In the stripped area 8, conductor 4 is free of insulation 6.

Figure 1C:
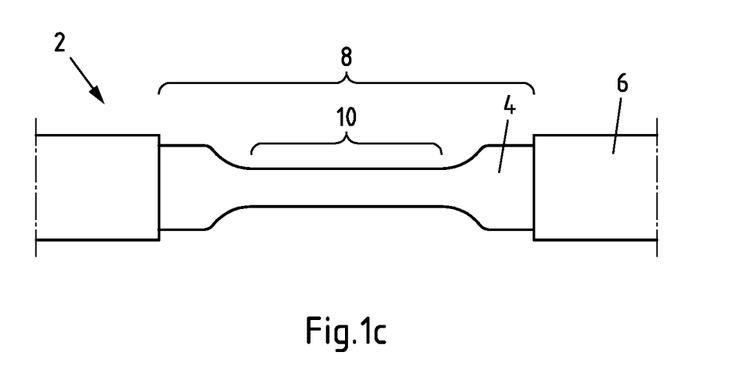
FIG. 1c a view of a stripped, compacted cable.

After the stripped area 8 is produced, the cable 2 or its conductor 4 can be compacted. Through compacting, the flat area 10 can be produced by a respective tool. The flat area 10 preferably has a width which is larger than the diameter of conductor 4 by a factor of at least 2, preferably between 2 and 5, and a height which is smaller than the diameter of conductor 4 by at least a factor of 2, preferably between 5 and 10. The height is shown in FIG. 1c. In FIG. 1c the flat area 10 is shown.

Figure 2:
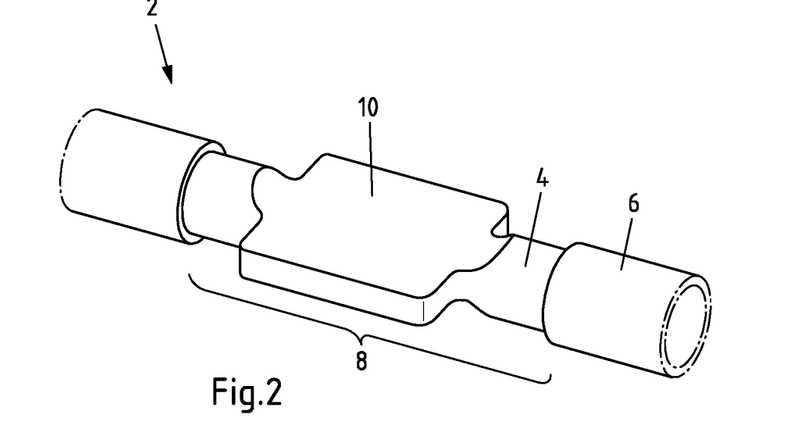
FIG. 2 a view of a cable according to FIG. 1.

FIG. 2 shows a view of a cable 2 as shown in FIG. 1c. It can be seen that the conductor 4 is a round conductor and is flat in the flat area 10. The flat area 10 is located in the stripped area 8, which is positioned away from the distal ends of the cable 2.

When compacting, a material bond can be formed directly between the strands of conductor 4. The strands are pressed together and simultaneously welded together. Here, the pressing tool can also be a welding tool, especially an ultrasonic tool.

Figure 3A:
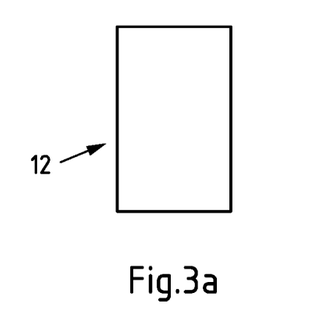
FIG. 3a a view of a connecting bolt according to a example embodiment.

FIG. 3a shows one connecting element as connecting bolt 12, but all other connecting elements are referred to in the following and the description also applies to other connecting elements where appropriate. The connecting bolt 12 shown in FIG. 3a is cylindrical and made of a solid material. In particular, connecting bolt 12 can be made of stainless steel. However, it is also possible to form connecting bolt 12 from copper, aluminium or alloys of these. Connecting bolt 12 can be formed by turning or by cutting a rod.

Figure 3B:
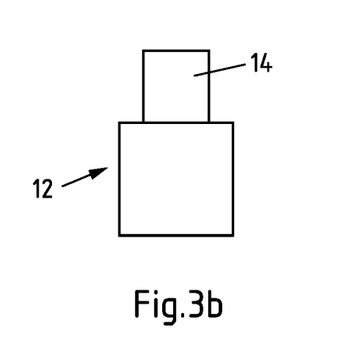
FIG. 3b a view of a connecting bolt according to another embodiment.

FIG. 3b shows a connecting bolt 12 with a connecting lug 14 at one end, to which a clamping element of an electrical connection can be clamped, for example. In particular, a clamp in the form of a battery pole clamp can be clamped to the terminal lug 14.

Figure 3C:
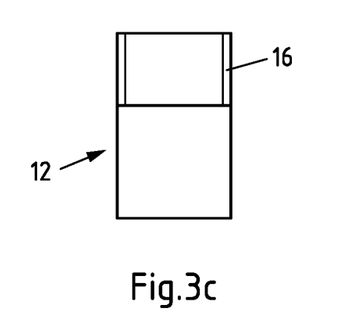
FIG. 3c a view of a connecting bolt according to another embodiment.

FIG. 3c shows a connecting bolt 12 in with one end fitted with a thread 16. An electrical connection, for example, can be screwed to such a connecting bolt 12.

Figure 3D:
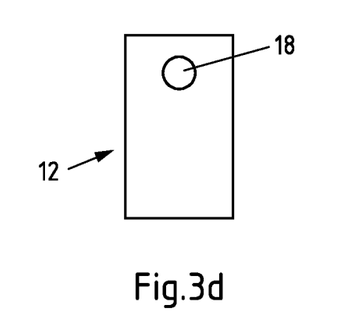
FIG. 3d a view of a connecting bolt according to a further embodiment.

FIG. 3d shows another connecting bolt 12, which has an opening 18 at its end, especially in the form of a screwed hole. Through this opening 18, for example, a screw connection can be made to an electrical connection by pushing a screw through an opening 18 and/or screwing it there.

Figure 4:
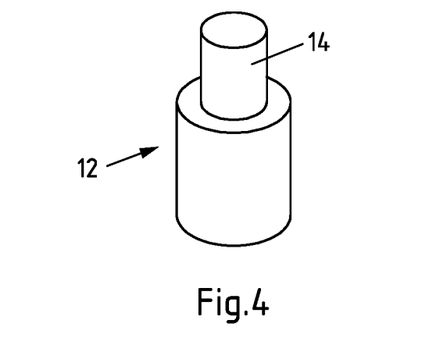
FIG. 4 a view of a connecting bolt according to FIG. 3b.

FIG. 4 shows a connecting bolt as shown in FIG. 3b in one view. It can be seen that the cylindrical bolt 12 has a smaller radius in the area of the connecting lug 14 and is formed to accommodate a clamping element, for example.

Figure 5A:
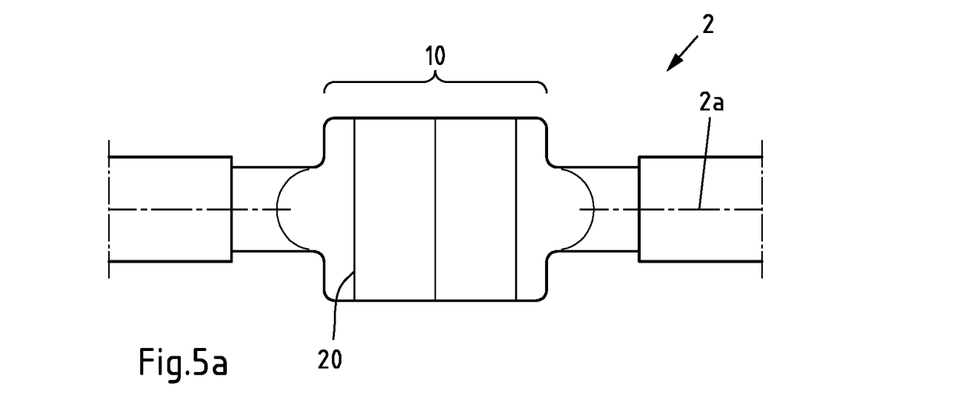
FIG. 5a-c a top view of a connecting bolt according to another embodiment; FIG.

FIG. 5a shows a top view of a cable 2. It can be seen that a relief-shaped profile 20 is embossed in the flat area 10. The areas of the profile 20 with an increased compression run essentially perpendicular to the longitudinal axis 2a of the cable 2. The profile 20 can be provided on both sides of the flat area 10 and can be uniform.

Figure 5B:
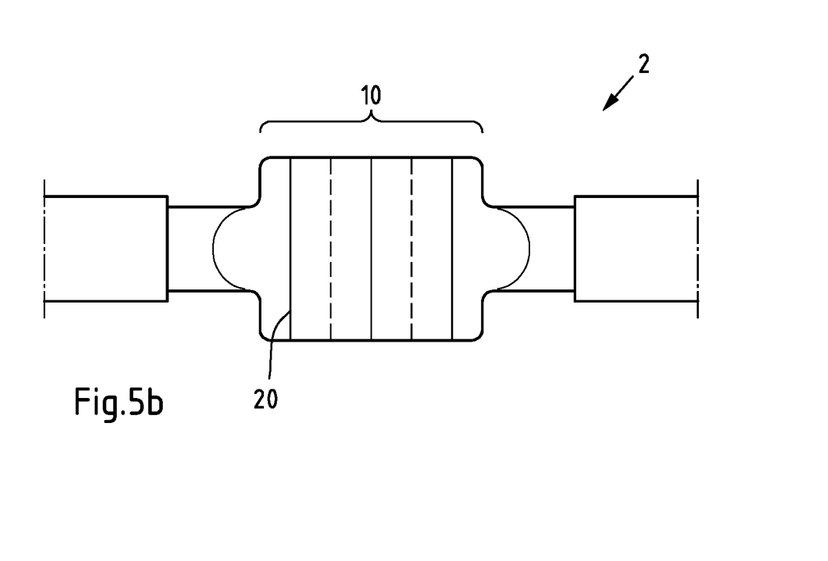

FIG. 5b shows a cable 2 in which the profile 20 has been embossed by complementary tools on both sides of area 10. Here the dashed lines are on the side of area 10 facing away from the drawing plane.

Figure 5C:
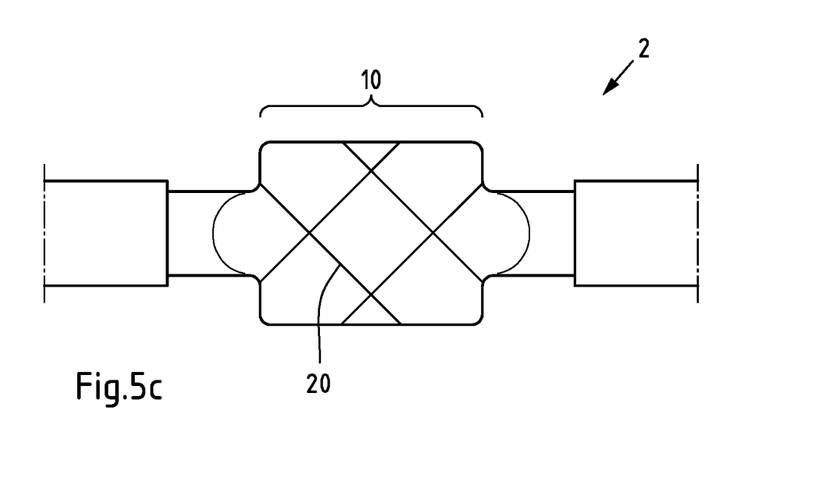

FIG. 5c shows a cable 2 where the profile 20 has been embossed as a grid structure in the area 10.

The strands of cable 4 are highly compacted by profile 20 and there is a material bond at least in the area of the profile. This makes it possible to weld a connecting bolt 12 or another connecting element directly onto the cable 4 or its strands after compacting.

Figure 6A:
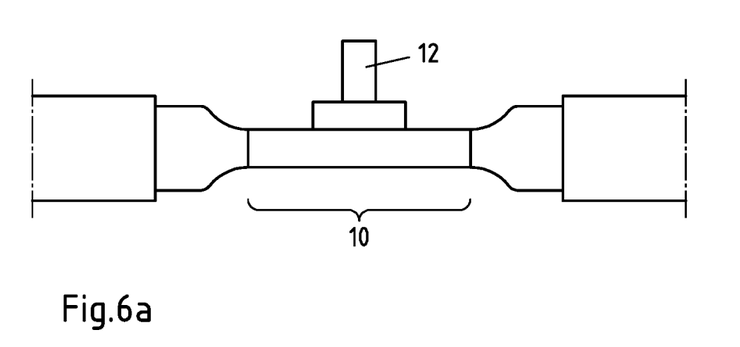
FIG. 6a, b views according to an embodiment.
Figure 6B:
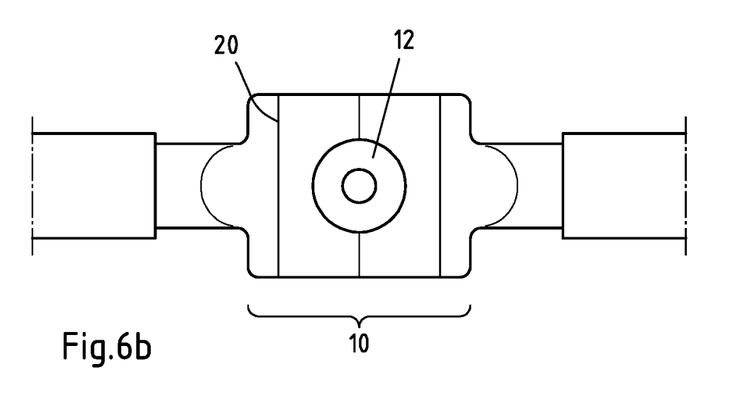

FIG. 6a, b show a connecting bolt 12 which is welded directly onto the flat area 10 within the flat area 10. Due to the profile, the flat area 10 is suitable and sufficiently compacted for the connecting bolt to be mounted, e.g. by rotary friction welding or ultrasonic welding.

Figure 7A:
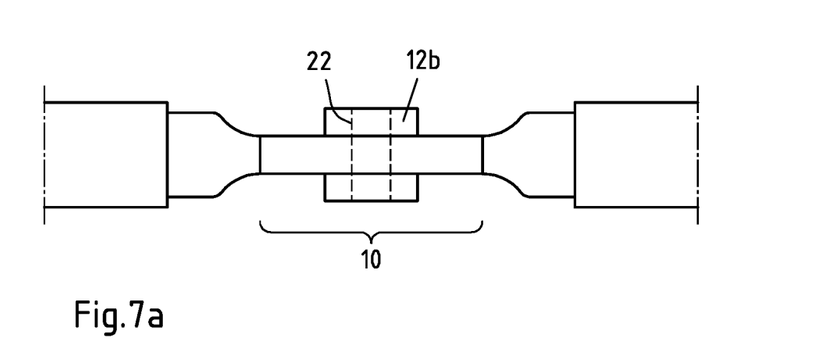
FIG. 7a, b views according to an embodiment.
Figure 7B:
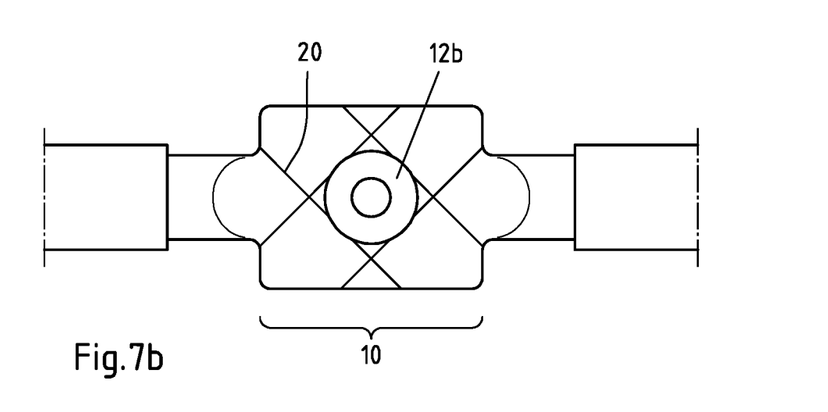

FIGS. 7a, b show a flat area 10 in which an opening 22 was made during or after compaction, in particular by punching. A sleeve 12b can be inserted into this opening 22 as a further possible connecting element. The outer flanges of sleeve 12b can then be welded to the strands of conductor 4 in the flat area 10. The sleeve 12b can also have a flange on one side only, so that it can be welded on one surface of the flat area 10 only with the flange.

What is claimed is:

1. Method for establishing a connection between an electrical connecting element for a motor vehicle on-board network and a cable of the motor vehicle on-board network, comprising:
    providing the cable having a metallic stranded conductor;
    first, mechanically compacting the metallic stranded conductor in such a way that a flat area extending in a longitudinal direction of the conductor is formed with a degree of compaction of between 70% and 100%, wherein during the compaction a material bond is formed between strands of the stranded conductor along the longitudinal direction, and wherein the flat area is compacted by a welding of the strands of the stranded conductor; and
    wherein during the compacting bare strands of the metallic stranded conductor are pressed against each other in the flat area and welded to each other in the flat area,
    then welding the electrical connecting element to the flat area with a material bond.

2. Method of claim 1, wherein the flat area is compacted by means of ultrasonic welding or by means of resistance welding.

3. Method of claim 1, wherein an end-to-end recess is formed in the flat area and the electrical connecting element is arranged in the recess.

4. Method of claim 1, wherein the electrical connecting element is ring-shaped.

5. Method of claim 1, wherein the electrical connecting element is connected to the strands in a material bond on both sides of the flat area.

6. Method of claim 1, wherein a profile is introduced into the flat area during welding.

7. Method of claim 6, wherein the profile is a relief-shaped profile embossed into the flat area during welding which runs at an angle to the longitudinal axis of the strands of the stranded conductor.

8. Method of claim 6, wherein the profile is strip-shaped or grid-shaped.

9. Method of claim 6, wherein the profile is introduced on both sides of the flat area.

10. A device comprising:
    a cable with a metallic stranded conductor obtained by mechanically compacting the metallic stranded conductor in such a way that a flat area extending in a longitudinal direction of the conductor is formed with a degree of compaction of between 70% and 100%, wherein during the compaction a material bond is formed between strands of the stranded conductor along the longitudinal direction, and wherein the flat area is compacted by a welding of the strands of the stranded conductor,
    wherein during the compacting bare strands of the metallic stranded conductor are pressed against and welded to each other in the flat area.

11. The device of claim 10, wherein the stranded conductor is a round conductor and/or that the stranded conductor is formed from aluminium or an alloy thereof and/or that the stranded conductor is formed from solid material.

12. The device of claim 10, wherein the cable further includes an insulation of the stranded conductor, and wherein the flat area is arranged in a stripped region of the cable arranged between two insulation sections of the insulation.

13. The device of claim 12, wherein the insulation in the insulation sections completely encloses the stranded conductor.

14. The device of claim 10, further comprising an electrical connecting element connected to the conductor in the flat area by a material bond.

15. The device of claim 14, wherein the electrical connecting element is formed from aluminium or alloys thereof and/or the electrical connecting element is formed from copper or alloys thereof, steel or stainless steel and/or the electrical connecting element is tin-plated and/or under-nickel-plated.

16. The device of claim 14, wherein the electrical connecting element is connected to the flat area by means of ultrasonic welding.

17. The device of claim 14, wherein the electrical connecting element is connected to the flat area by means of friction welding, in particular rotational friction welding.

18. The device of claim 14, wherein the electrical connecting element is ring-shaped sleeve-shaped and is connected to the flat area on both sides of the flat area with collars pointing radially outwards in a material bond.

19. The device of claim 14, wherein the electrical connecting element and the stranded conductor are encased, preferably overmoulded, with an insulation, in particular beyond the insulation of the stranded conductor.

20. The device of claim 14, wherein the cable is electrically coupled to a motor vehicle battery for carrying power from the battery.

* * * * *